United States Patent Office 3,164,628
Patented Jan. 5, 1965

3,164,628
METHOD FOR PREPARING ACRYLONITRILE
Saburo Minekawa, Shohei Hoshino, Atsushi Shibata, and Naoya Kominami, Tokyo, Japan, assignors to Asahi Kasei Kogyo Kabushiki Kaisha, Osaka, Japan, a corporation of Japan
No Drawing. Filed June 13, 1961, Ser. No. 116,678
Claims priority, application Japan, June 21, 1960, 35/28,375
5 Claims. (Cl. 260—465.3)

The invention relates to a method for preparing acrylonitrile in a one step process by gas phase catalytic reaction of propylene, ammonia and air or molecular oxygen over a catalyst.

Recently, it is known that the above reaction can be conveniently conducted employing bismuth phosphomolybdate as a primary catalyst to provide a satisfactory yield. As a result of our various research work on the reaction, we have found several catalysts which produce acryonitrile in good yield. This invention is based on the discovery of superior catalysts which catalyze the above reaction very effectively.

This invention is featured in the employment of oxidation catalyst wherein tellurium oxide and phosphomolybdic acid or molybedenum oxide are supported on active alumina and not heated above 1000° C. to conduct said reaction. It is particularly important in this invention that active alumina is employed as a carrier and active alumina is not calcined at the temperature above 1000° C.

It has been well known prior to the present invention that active alumina must be calcined at high temperature when employed as a carrier of tellurium oxide and phosphomolybdic acid or molybdenum oxide system catalyst. However, as a result of our various research, contrary to the above, we have found that when heated above 1000° C., the catalytic activity decreases and results in lower yield of acrylonitrile. Considering this fact, in this invention active alumina as a carrier is not heated over 1000° C., thus by-production of acrolein is suppressed and the yield of acrylonitrile is increased compared with the employment of silica as a carrier.

It is quite advantageous that the by-production of acrolein is suppressed in the conduction of said reaction and the trouble due to the production of acrolein when the process is conducted in the scale of actual industry. When the alumina calcined above 1000° C. is employed, the rate of reaction of propylene extremely decreases, the yield of acrylonitrile lowers and results in the production of a considerable amount of acrolein.

Any conventional process may be applied in the preparation of catalyst, but it is preferable to mix active alumina powder, tellurium oxide and ammonium phosphomolybdate or molybdenum oxide, mold the admixture into the particles having suitable size, and then calcine these particles.

In the preparation of such catalyst, the heating of active alumina and the heating with other catalyst components should not exceed 1000° C. In general, the catalyst is prepared by heating said catalyst composition with active alumina and the minimum temperature is about 300° C., the heating of active alumina is conducted at the temperature below 1000° C., about 300° C. but the lower limitation of the temperature of heating of active alumina is sometimes lower than 300° C. since the temperature of heating in the preparation of catalyst varies depending on the catalyst composition.

The catalyst composition of this invention is, for instance, indicated in the following molar ratio:

$P=0-3$, $Te=3-15$, $Mo=5-20$, $Al_2=20-50$

The composition of reaction gas employed in the present process can be varied in wide range. However, about 10% of propylene concentration gives desirable yield. The preferable molar ratio of ammonia to propylene is 1.0 to 2.0, and the yield cannot be increased in the molar ratio of above 2.0, hence, disadvantageous in the economical point of view.

The pressure of reaction system is preferably atmospheric pressure or slightly higher.

The reaction temperature is about 300° C. and below 480° C., preferably 350° C. to 450° C. and the contacting time is in the ranye from 0.2 to 20 seconds, preferably 5 to 12 seconds.

Any type of apparatus generally employed in the gas phase oxidation reaction can be employed to conduct the present invention, and fixed bed type, fluidized bed type reactor can be employed. A preferred embodiment of the present invention is stated in the following example.

*Example*

60 parts of active alumina powder, 20 parts of tellurium oxide and 20 parts of ammonium phosphomolybdate are thoroughly admixed and molded to 6 to 10 mesh after kneading for a long period of time with the addition of small amount of water, then dried. After calcining at 400° C. for 4 hours while passing air thereover, these particles are employed as catalysts. 20 cc. of the resultant catalyst is packed into hard glass tube suitably diluated quartz chips. The reaction tube is dipped into Niter bath maintained at the temperature indicated in the following table, and the gas mixture of propylene 7.1%, ammonia 7.3%, air 85.6% is introduced at the flow rate of 133 cc./min. The analysis of reaction products is mainly effected by gas chromatography.

| | Yield Percent | | | | |
|---|---|---|---|---|---|
| Niter bath, temp. ° C | 340 | 360 | 380 | 400 | 410 |
| Acrylonitrile | 18.5 | 43.0 | 55.6 | 61.2 | 64.3 |
| Acetonitrile | 12.7 | 12.5 | 9.3 | 6.8 | 5.7 |
| Carbon dioxide | 7.2 | 12.4 | 15.0 | 21.0 | 22.0 |
| Hydrogen cyanide | 2.1 | 4.2 | 5.3 | 4.3 | 2.3 |

The yield in the above table is indicated in the molar yield of the product to 1 mol of propylene supplied. Comparative experiments were conducted employing the catalyst supported on silica. The catalyst prepared from 60 parts of silica gel, 20 parts of tellurium oxide, 20 parts of ammonium phosphomolybdate by the above process is employed and the same reaction gas employed in above experiment is reacted at Niter bath temperature of 400° C., and following results are obtained.

|  | Yield, Percent |
|---|---|
| Acrylonitrile | 30.0 |
| Acetonitrile | 4.2 |
| Acrolein | 17.9 |
| Acetaldehyde | Trace |
| Carbon dioxide | 14.0 |
| Hydrogen cyanide | 0.5 |

In case silica carrier is employed, the yield of acrylonitrile is inferior and considerable amount of acrolein is resulted comparing with alumina carrier.

The result obtained by employing alumina powder calcined at 1000° C. for 5 hours in place of active alumina, employing the catalyst prepared through the above process and having same composition under same reaction condition is stated in the following table.

| | Yield, Percent |
|---|---|
| Acrylonitrile | 12.0 |
| Acetonitrile | 0.3 |
| Acrolein | 34.2 |
| Acetaldehyde | 1.0 |
| Carbon dioxide | 15.0 |
| Hydrogen cyanide | 0.2 |

As obvious from the above result, when alumina is calcined at high temperature the yield of acrylonitrile is substantially reduced and a considerable amount of acrolein is produced.

What we claim is:

1. Process for making acrylonitrile comprising contacting gaseous mixture of propylene, ammonia, and molecular oxygen with catalyst at a temperature between 300 and 480° C. in a single step, said catalyst being a member selected from the group consisting of
   (1) tellurium oxide, molybdenum oxide and alumina, and
   (2) tellurium oxide, phosphomolybdic acid and alumina, said catalyst being preheated at between 300 and 1000° C.

2. Process of claim 1 wherein said gaseous mixture and said catalyst are contacted for between 0.2 and 20 seconds.

3. Process of claim 1 wherein said catalyst is preheated at a temperature of about 400° C. for about 4 hours while concomitantly passing air thereover, whereby said catalyst is calcined.

4. Process of claim 1 wherein the molar ratio of ammonia to propylene is 1.0 to 2.0.

5. Process of claim 4 wherein the propylene concentration in said gaseous mixture is about 10% by volume.

References Cited by the Examiner
UNITED STATES PATENTS

| | | | |
|---|---|---|---|
| 2,481,826 | 9/49 | Cosby | 260—465.3 |
| 2,904,580 | 9/59 | Idol | 260—465.3 |
| 3,009,943 | 11/61 | Hadley et al. | 260—465.3 |

OTHER REFERENCES

Bergmann: "Acetylene Chemistry," page 80, 1948.

CHARLES B. PARKER, *Primary Examiner.*